Aug. 12, 1958
B. T. POLSTON
2,846,864
EMERGENCY BRAKE LOCK
Filed Aug. 16, 1955
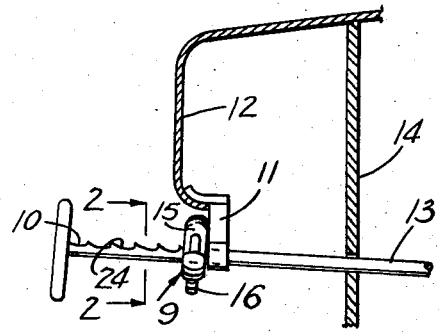
FIG. 1
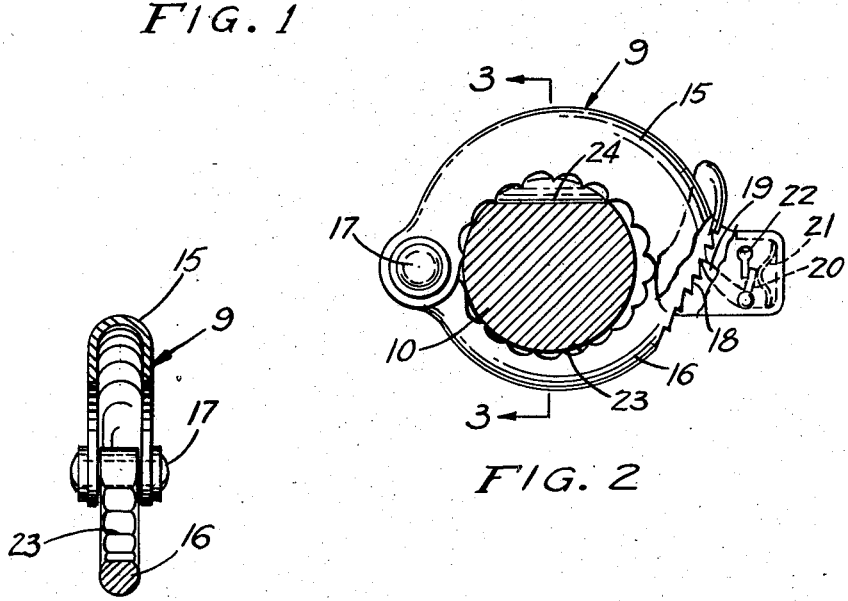
FIG. 2
FIG. 3
INVENTOR.
BILL T. POLSTON
BY
McMorrow, Berman & Davidson
ATTORNEYS United States Patent Office 2,846,864
Patented Aug. 12, 1958

2,846,864

EMERGENCY BRAKE LOCK

Bill T. Polston, Louisville, Ky.

Application August 16, 1955, Serial No. 528,768

2 Claims. (Cl. 70—181)

The present invention relates to a lock for the emergency or hand brake of a vehicle.

An object of the present invention is to provide a locking device for securing the hand brake pull rod of a vehicle in extended position so that the vehicle cannot be moved.

Another object of the present invention is to provide a means for locking the direct pull-type of emergency or hand brake lever of a vehicle in an extended position of the lever against unauthorized or accidental release of the lever.

A further object of the present invention is to provide a lock for the hand brake pull rod of a vehicle which is simple in structure, sturdy in construction, and one which is economical to manufacture and assemble.

These and other objects and advantages of the present invention will be fully apparent from the following description when taken in connection with the annexed drawing, in which:

Figure 1 is a view in elevation showing a portion of the instrument panel or dashboard and a portion of the fire wall of a vehicle, and the hand brake pull rod of the vehicle with the device of the present invention installed thereon, Figure 2 is a front elevational view greatly enlarged as taken on line 2—2 of Figure 1, and Figure 3 is a sectional view taken on line 3—3 of Figure 2.

Referring in greater detail to the drawing in which like numerals indicate like parts throughout the several views, the emergency or hand brake pull rod of a vehicle is shown in Figure 1 and indicated by the reference numeral 10, and is mounted in a bracket 11 which is dependingly carried on the lower end of a vehicle instrument panel indicated by the reference numeral 12. The pull rod 10 is mounted in the bracket 11 for extensile and retractile movement relative to the bracket and is supported in a tubular member 13 which projects through the fire wall 14 of the vehicle. As shown in Figure 1, the pull rod 10 is in its extended position for setting the brakes of the vehicle, the portion of the pull rod outwardly of the bracket being provided with notches 24, the purpose of which will be subsequently described.

The lock device of the present invention is connectable to the portion of the pull rod 10 outwardly of the bracket 11 when the pull rod is in its extended position for setting the vehicle brakes and in Figure 1 the device is shown connected to the aforesaid pull rod portion. Such device comprises a pair of jaws 15 and 16 arranged in face to face relation and connected together at one of their adjacent ends by a rivet 17 for opening and closing movement with respect to each other. Cooperating interlocking means is provided on the other adjacent ends of the jaws 15 and 16 for detachably holding the jaws 15 and 16 in their closing movement position and consists in a portion of the jaw 16 adjacent to the other end thereof extending slidably through an aperture formed in the jaw 15 adjacent its other end, the extending jaw portion being provided with spaced notches 18 on one side thereof. The portion of the jaw 15 between the aperture and the end remote from the rivet 17 is provided with a lock consisting in a pawl 19 pivotally mounted within the portion of the jaw 15 between the aperture and the end remote from the rivet 17 releasably engageable with any one of the notches 18.

A lug 20, shown in dotted lines in Figure 2, is fixedly carried by the pawl 19 and is contacted by the bowed intermediate portion of a leaf spring 21 with its ends fixedly anchored in the said portion of the jaw 15, also shown in dotted lines in that fiigure, to bias the pawl 19 toward the notches 18. The one face of the end portion of the jaw 15 intermediate the aperture and the end remote from the rivet 17 is provided with a keyhole 22 through which a key (not shown) may be inserted to act against the lug 20 to shift the pawl 19 out of engagement with the one of the notches 18 to release the end portion of the jaw 16 from its engagement with the adjacent portion of the jaw 15. The confronting faces of each of the jaws 15 and 16 are provided with metal-cutting teeth 23.

With the lock device of the present invention in position on the portion of the pull rod outwardly of the bracket, the position as shown in Figure 1, the pull rod is securely fixed in its extended position securing the brakes of the vehicle against unauthorized or accidental release. When it is desired to release the vehicle brakes, a suitable key inserted in the keyhole 22 provided in the one face of the end portion of the jaw 15 and turned in the required direction will bear against the lug 20 to shift the pawl 19 out of its engagement with the adjacent notch 18, thereby releasing the adjacent end portions of the jaws 15 and 16 from their locked position, permitting them to be opened relative to each other and removed from their position embracingly engaging the pull rod. When positioned on the pull rod, the teeth 23 on the inner faces of the jaws 15 and 16 engage the metal of the pull rod and also engage one or more of the notches 24 provided on the pull rod for engagement by a ratchet means (not shown) for releasably holding the pull rod in the extended position.

What is claimed is:

1. The combination with a bracket dependingly carried by a vehicle panel and a hand brake pull rod having spaced notches therealong mounted in said bracket for extensile and retractile movements, of a lock device positioned in abutting relation with respect to said bracket and connectable to the portion of the pull rod outwardly of said bracket when said pull rod is in an extended position, said device comprising a pair of jaws arranged to face to face relation and connected together at one of their adjacent ends for opening and closing movement with respect to each other positioned so that the adjacent faces of said jaws abut against said bracket with the jaws embracingly engaging said pull rod portion, cooperating interlocking means on the other adjacent ends of said jaws for detachably holding the jaws in the closing movement position, said means embodying a pawl pivotally carried by one of said jaws releasably engageable with a selected one of a plurality of notches formed on the other of said jaws, and a lug carried by said pawl and bearing against the bowed intermediate portion of a leaf spring which has its extends fixedly anchored to said one jaw, and tooth means on the confronting faces of each of said jaws engageable with the notches on said pull rod portion.

2. The combination with a bracket dependingly carried by a vehicle panel and a hand brake pull rod having spaced toothed notches therealong mounted in said bracket for extensile and retractile movements, of a lock device positioned in abutting relation with respect to said bracket and connectable to the portion of the pull rod outwardly of said bracket when said pull rod is in an extended position, said device comprising a pair of jaws arranged in face to face relation annd connected together at one of their adjacent ends for opening and closing movement with respect to each other positioned so that the adjacent faces of said jaws abut against said bracket with the jaws embracingly engaging said pull rod portion, one of said jaws being provided with an aperture positioned inwardly from the other end thereof receivably engageable with the portion of the other of said jaws adjacent the other end of the latter, said jaw portion being provided with spaced notches on one side thereof, a pawl pivotally carried on said first named jaw releasably engageable with a selected one of the notches on said jaw portion, a leaf spring having its ends fixedly anchored on said first named jaw portion and having an intermediate bowed portion, a lug fixedly carried by said pawl and contacting the bowed portion of said spring for biasing said pawl toward said jaw portion notches, and tooth means on the confronting faces of said jaws engageable with the notches on said pull rod portion.

References Cited in the file of this patent

UNITED STATES PATENTS

| | | |
|---|---|---|
| 327,575 | Mitchell | Oct. 6, 1885 |
| 830,411 | Butchart | Sept. 4, 1906 |
| 931,685 | Crim et al. | Aug. 17, 1909 |
| 1,017,955 | Carney | Feb. 20, 1912 |
| 1,025,180 | Wreford | May 7, 1912 |
| 1,421,059 | Bashara | June 27, 1922 |
| 2,709,356 | Bristow | May 31, 1955 |

FOREIGN PATENTS

| | | |
|---|---|---|
| 151,373 | Australia | May 11, 1953 |